United States Patent [19]

Blum et al.

[11] 4,250,554

[45] Feb. 10, 1981

[54] SYSTEM FOR ORDERED MEASUREMENT AND COMPUTATION

[75] Inventors: Herbert Blum, 100 De Mott Ave., Rockville Centre, N.Y. 11570; Kevin B. Austin, Ridgewood, N.Y.

[73] Assignee: Herbert Blum, Rockville Centre, N.Y.

[21] Appl. No.: 940,324

[22] Filed: Sep. 7, 1978

[51] Int. Cl.³ .............................................. G03B 27/32
[52] U.S. Cl. .................................... 364/560; 364/562; 355/61
[58] Field of Search ............... 364/560, 561, 562, 563, 364/709; 33/133, 140, 142, 148 H; 235/83, 92 DN, 92 SB, 92 DM; 355/55, 56, 59, 61

[56] References Cited

U.S. PATENT DOCUMENTS

| | | |
|---|---|---|
| 3,688,672 | 9/1972 | Hanson et al. .......................... 355/55 |
| 3,832,058 | 8/1974 | Gusovius ................................ 355/56 |
| 3,906,208 | 9/1975 | Rogers ................................. 364/567 |
| 4,021,115 | 5/1977 | Jeppesen ............................... 355/56 |
| 4,113,378 | 9/1978 | Wirtz .................................... 355/55 |
| 4,158,229 | 6/1979 | Woo, Jr. et al. .................. 33/125 A |

Primary Examiner—Charles E. Atkinson
Assistant Examiner—Gary Chin
Attorney, Agent, or Firm—Watson, Leavenworth, Kelton & Taggart

[57] ABSTRACT

Signals indicative of values of measured parameters of diverse type are transferred, with computing function signals, to a calculator connected on-line with measuring devices generating the signals for determining and displaying the percentage of the measured values. In an expanded mode, the system accommodates ratio determination between either of such measured values and a non-measured value of corresponding type entered into the calculator keyboard.

15 Claims, 4 Drawing Figures

SYSTEM FOR ORDERED MEASUREMENT AND COMPUTATION

FIELD OF THE INVENTION

This invention relates to systems for ratio determining and pertains more particularly to systems for providing reproduction ratios for use in the graphic arts.

BACKGROUND OF THE INVENTION

Need frequently arises in the printing industry for proportional size transfer of a photograph or like item to be included in a printed text. Customarily, such size transfer is accommodated manually by making a measurement of an original, making notation of the measurement and repeating these steps for the intended text size and then computing the ratio thereof. These labors are both time consuming and laborious, rendering printing activities less efficient and more costly.

By way of known prior art teachings which may be material to the invention discucced below, planimeter devices are widely known, for example, as shown in U.S. Pat. No. 2,118,773 to Ball and U.S. Pat. No. 3,497,959 to Englesman. The planimeter of Ball, which is described as being usable in reduction or enlargement, involves an input wheel engageable with the surface of the original for displacing an indicator on wheel rotation in traveling across the original. The Englesman planimeter involves an apertured wheel which generates output pulses by interrupting a light beam in the course of wheel movement, thereby indicating distance transversed. Neither Ball nor Englesman disclose any companion apparatus cooperative with such planimeters to directly indicate reduction/enlargement ratio. In a separate type of known prior art, output magnification indicating means is disclosed in U.S. Pat. No. 4,021,115 to Jeppesen. Jeppesen teaches apparatus providing such output indication upon relative movement of a lens and an object supporting plate.

SUMMARY OF THE INVENTION

The present invention has as its object the provision of a ratio indicating system of type proceeding from the measurement of size parameters directly through to output ratio indication.

A more particular object of the invention is to accommodate both measured and non-measured size data in such system.

In attaining the foregoing and other objects, the invention provides, in a normal measured parameter mode, means for measuring an original size and a reproduction size, means for releasably storing both such measurements, and a sequencing means for controllably transferring such measurements to a calculating device with interspersed functional directions to the calculating device to affect the ratio determination. In its mode comingling measured size and non-measured size information, the invention further includes means for accommodating such comingling. The accommodating means is effective to time-correlate the successive transfer to the calculator of measured and non-measured data in accordance with timing established by the sequencing means. In this latter mode, one may preselect a non-measured size value for reproduction and store the same by manual entry in a calculator. In system operation, such manually-stored information is recalled during the time period in which the system would normally provide for the reading, from the releasably storage means, of measured reproduction size data. As is explained in detail below, one may preselect either original size or reproduction size data, both of which are accommodated in the latter mode of the invention.

The foregoing and other objects and features of the invention will be further understood from the following detailed discussion of preferred system embodiments and from the drawings wherein like reference numerals identify like parts throughout.

DETAILED DESCRIPTION OF PREFERRED EMBODIMENTS

Figure 1:
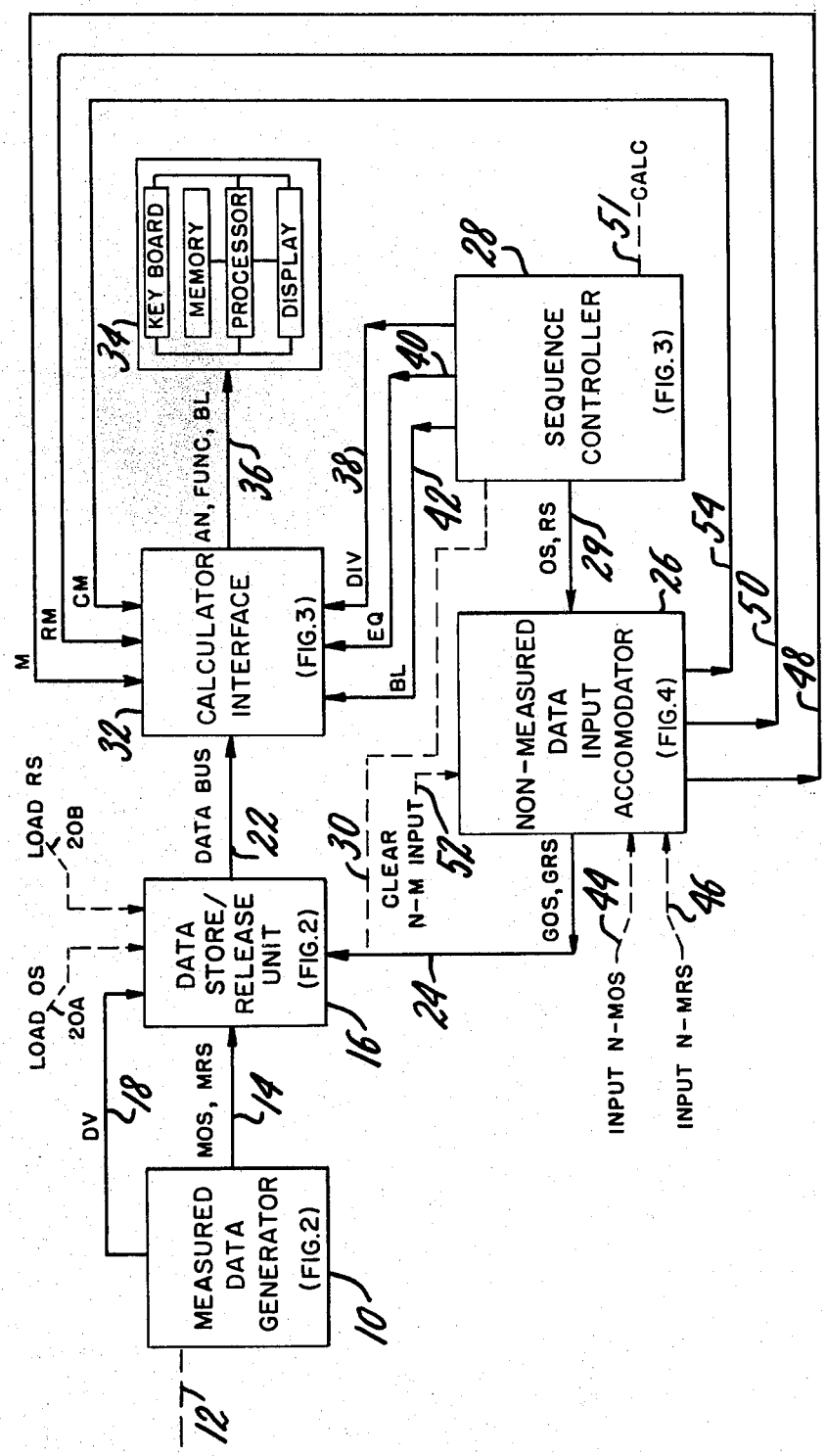
FIG. 1 is a block diagram indicating the function elements of the systems of the invention.

Referring to FIG. 1, measured data generator 10 is responsive to input indicated by reference numeral 12 to store size data MOS (measured original size) and MRS (measured reproduction size) and to provide output indication of values thereof on lines 14, thus constantly furnishing generated information to data store-release unit 16. Generator 10 furnishes a further input DV (data valid) to unit 16 over line 18, whereby unit 16 may accept only valid data generated by generator 10.

Data store/release unit 16 is responsive to two inputs LOAD OS, input 20A and LOAD RS, input 20B in its storing function. On input 20A, unit 16 stores original size data available on lines 14. On input 20B, unit 16 stores reproduction size data available on lines 14. In releasing stored data onto DATA BUS 22, unit 16 is responsive to signals supplied thereto on line 24. When the invention is practiced with a system of type having both of the above-discussed operating modes, the line 24 signals are provided by non-measured data input accommodator 26. In its embodiment operative only on measured size data, the system may omit accommodator 26, in which case sequence controller 28 may directly furnish the line 24 signals, as indicated by phantom line 30. As is discussed more fully in connection with the schematic diagrams below, the line 24 signals control the sequence of application of individual data onto the DATA BUS, the data being applied by calculator interface 32 to a calculator 34 having a memory capability, a keyboard, an arithmetic processor and a display. Interface 32 is operative to provide on line 36 both signals AN, indicative of arithmetic numerals, FUNC, indicative of calculating functions to be accomplished and BL signals, indicative of blanks to simulate key release and premit normal calculator operation. The AN signals are based on the content of the DATA BUS. Certain FUNC signals are originated in sequence controller 28 and applied to interface 32 over lines 38 and 40, respectively as DIV (divide) and EQ (equal). The BL signals are furnished by controller 28 line 42.

Lines 36 terminate individually within the calculator with a circuit connection thereto such that a change in voltage on lines 36 will have the same effect within the calculator as if a keyboard switch were operated and measured data is thereby entered in the calculator processor. In the system embodiment receptive to non-measured data, the keyboard of calculator 34 is operated for entry of such non-measured data and this entered data is then transferred to the calculator memory by operation of accommodator 26.

Accommodator 26 is activated by either input 44 (N-M OS; non-measured original size) or input 46 (N-M RS; non-measured reproduction size). The accommodator thereupon energizes output line 48, applying signal M (tranfer to memory) to interface 32. At a subsequent point in the calculation cycle, which is initiated by input 51 (CALC) to sequence controllerr 28, accommodator 26 will further selectively activate output line 50 to apply signal RM (recall from memory) to interface 32. At the conclusion of a system operation involving either inputs 44 or 46, input 52 (CLEAR N-M INPUT) is activated. Accommodator 26 is thereby cleared and output line 54 is activated to apply the signal CM (clear memory) to interface 32.

In a first example of operation of the FIG. 1 system, assume measured original size to be sixteen inches and so indicated by binary-coded decimal (BCD) MOS signals on line 14 and validated by line 18 signal DV. LOAD OS input 20A is activated, entering the digital original size into store-release unit 16. Next, reproduction size, i.e., enlargement or reduction size, is measured and indicated by BCD MRS signals on line 14 to be, for example, three and one-eighth inches, and also validated. LOAD RS input 20B is now activated, entering digital reproduction size into unit 16.

CALC input 51 is now activated and controller 28 applies OS (original size) and BL signals respectively successively to lines 29 and 42. The OS signals are gated through accommodator 26 as GOS (gated original size) signals on lines 24. On each GOS signal, unit 16 releases a single digit of the stored MOS data onto DATA BUS 22. Interface 32 decodes the BCD MOS signal code to indicate its arithmetic number content and to activate one of AN signal lines 36 and thereby enters the number in calculator 34. On the BL signal following each such GOS signal, interface 32 activates the BL lines of line 36, simulating a pause corresponding to a key release. At the conclusion of generation of such GOS and BL signals in number entering the entire MOS data in calculator 34, controller 28 activates line 38, whereupon interface 32 activates the FUNC signal lines of lines 36 to cause the calculator to set up a division of the entered MOS data and the next entered data.

After generating a BL signal following such calculator setup, controller 28 applies RS (reproduction size) and BL signals respectively successively to lines 29 and 42. The RS signals are gated through accommodator 26 as GRS (gated reproduction size) signals on lines 24. On each GRS signal, unit 16 releases a single digit of the stored MRS data onto DATA BUS 22. Interface 32 functions, as above discussed for the MOS data and BL signals, to enter the MRS data into the calculator. Controller 28 activates line 40, following the last BL signal in this sequence, to call for ratio determination as between the MOS and MRS data entered in the calculator, and display of the ratio, in the example, nineteen and one-half percent. The controller then resets itself in preparation for further operation.

By way of a second example of operation of the FIG. 1 system, assume one is to use measured original size but, in lieu of use of measured reproduction size, is to use predetermined reproduction size, for example, three and five-eighth inches. In this instance, the above-discussed practice is followed through the LOAD OS input. The reproduction size is now manually entered in the calculator keyboard. Input 46 is now activated and accommodator 26 activates line 48, in response to which the calculator transfers the entered reproduction size data to calculator memory.

On this setup of the system, CALC input 51 is activated and controller 28 generates OS and BL signals as above, with accommodator 26 gating the OS signals therethrough as GOS signals. The GOS and BL signals entered MOS data in the calculator as in the first example and the DIV line 38 signal sets up the calculator for division. On receiving RS signals from controller 28, accommodator 26 suppresses the same and does not deliver GRS signals to line 24. DATA BUS 22 is accordingly idle during this time period, and interface 32 simply conveys BL signals to calculator 34. Timed coincidentally with its receipt of one of the RS signals, accommodator 26 activates line 50 to create an RM (recall from memory) condition in the calculator. Following the RS-BL signal sequence, controller 28 generates the EQ signal on line 40 as in the first example and ratio computation and display proceeds as therein. The displayed result in this second example is twenty-two and one-half percent.

Figure 2:
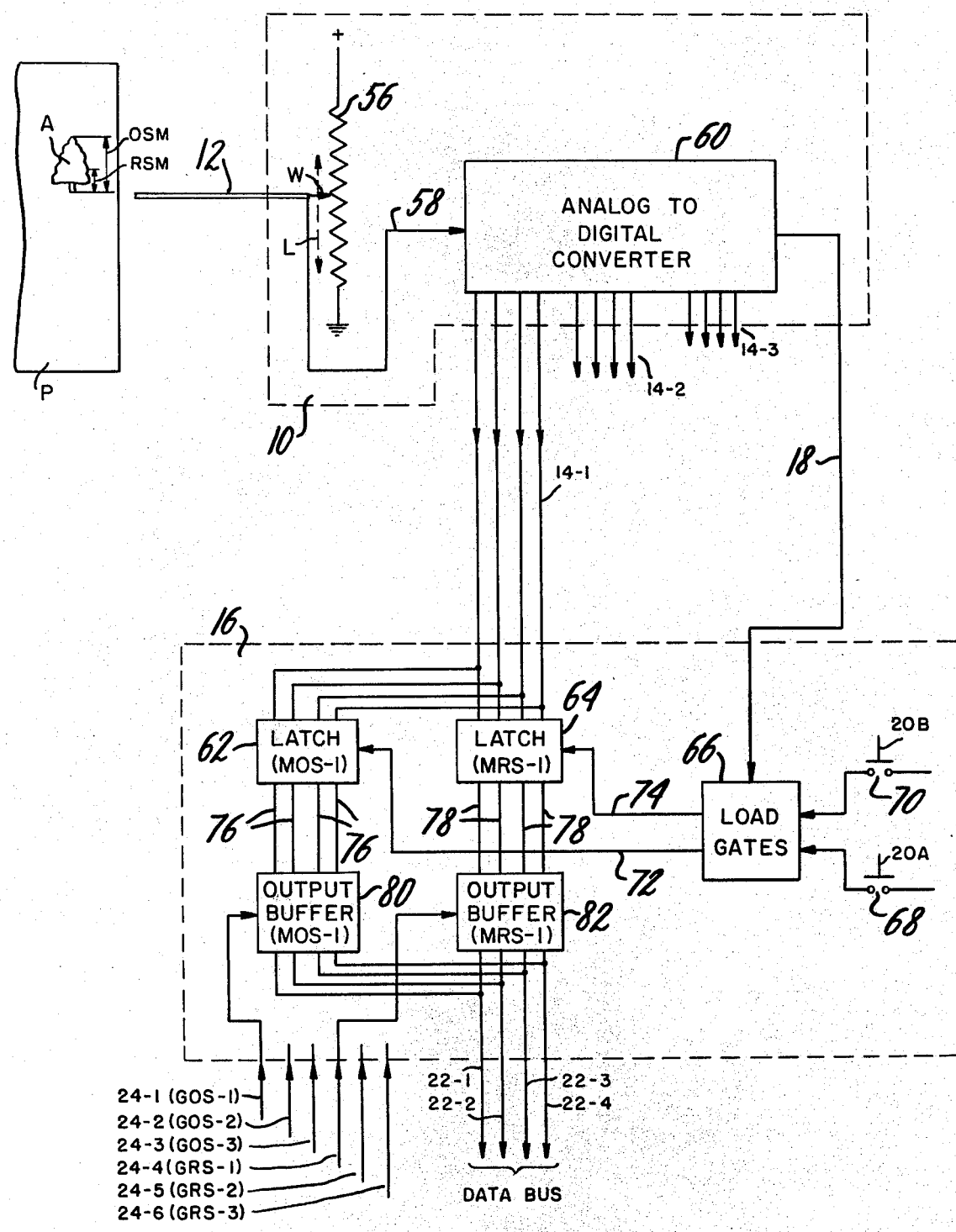
FIG. 2 is a schematic diagram of the preferred versions of the measured data generator and data store-release unit of FIG. 1.
Figure 3:
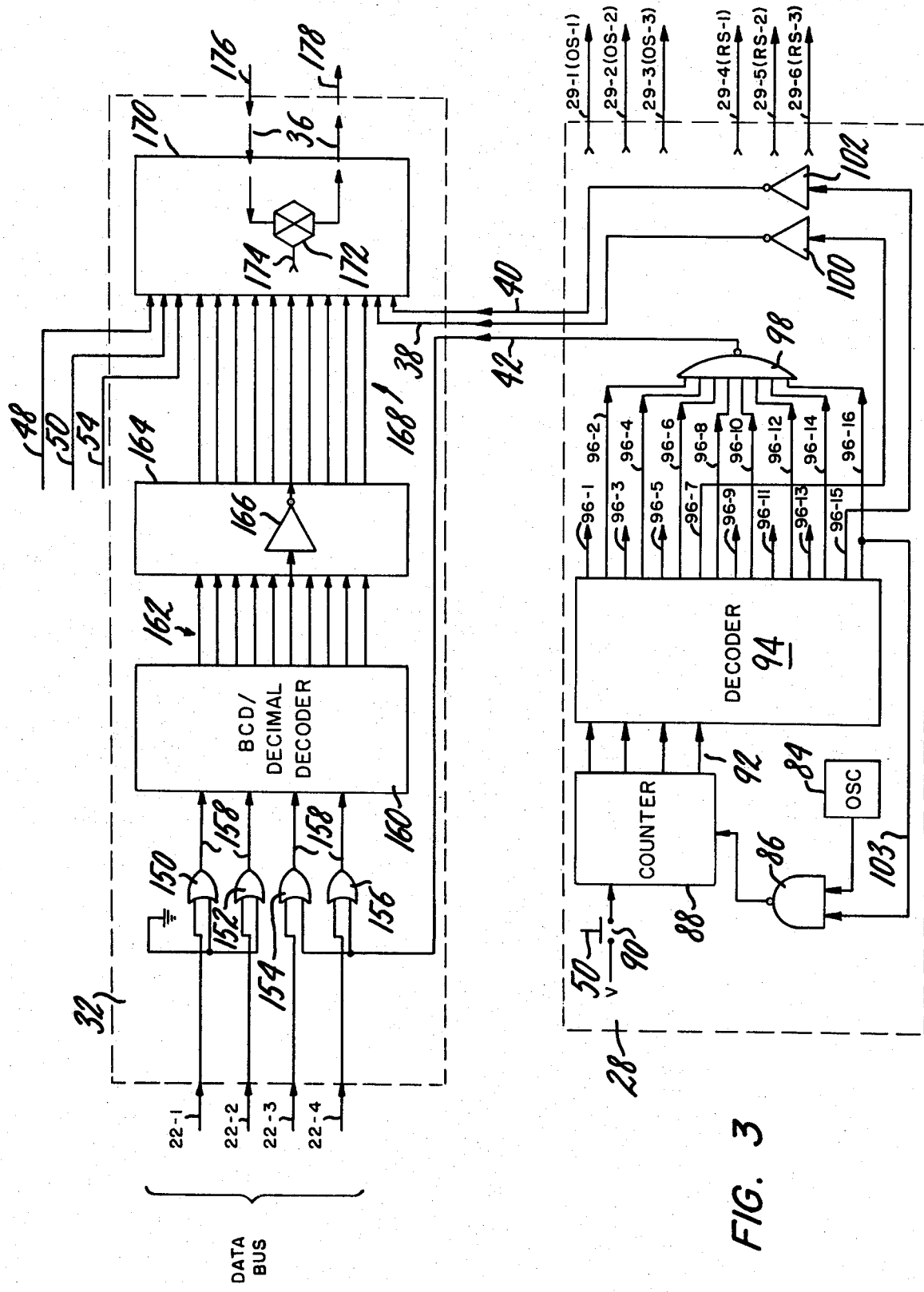
FIG. 3 is a schematic diagram of the preferred versions of the calculator interface and sequence controller of FIG. 1.
Figure 4:
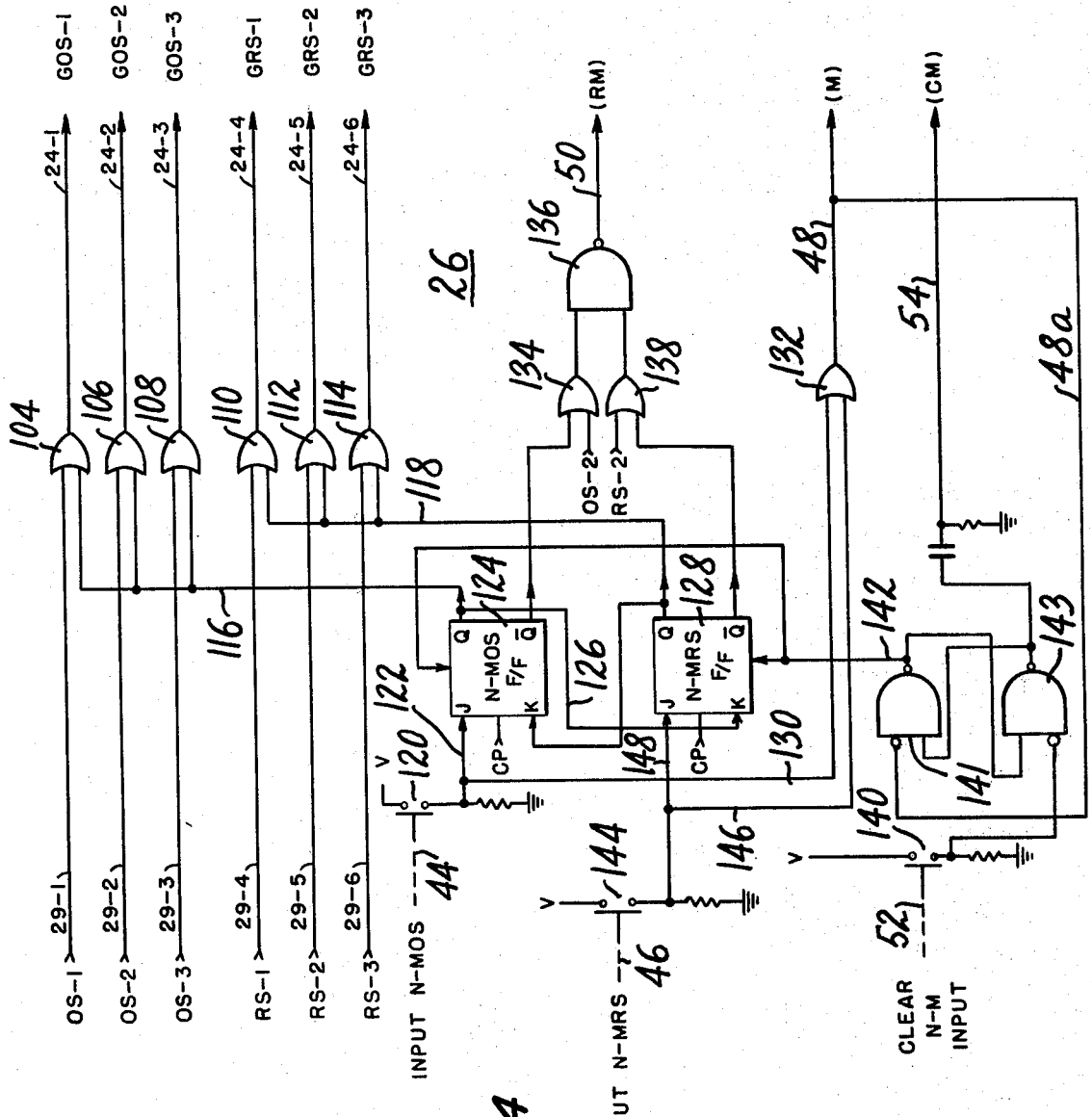
FIG. 4 is a schematic diagram of the preferred version of the non-measured data input accommodator of FIG. 1.

Reference will now be made to FIGS. 2-4 in explanation of the preferred circuit implementation of the FIG. 1 system. In FIG. 2, photograph P has a subdivision A of original size measure OSM. The selected reproduction size measure is RSM. Input 12 to measured data generator 10 is depicted as an index bar supported for movement along the line indicated as L. The wiper W of a potentiometer 56 is connected to index bar 12 for movement therewith and, with the potentiometer connected to a source of directcurrent (d-c) voltage (+), wiper output line 58 will conduct to analog to digital converter 60 a voltage of level corresponding to the position of index bar 12. Converter 60 provides first, second and third digit indications in BCD format, respectively on lines 14-1, 14-2 and 14-3. Three-digit accuracy is considered sufficient in the given application of the invention, but may be expanded as desired.

A suitable commercially-available choice for converter is DATEL ADC-EK12DC, a low power integrating analog to digital converter. With this choice, line 58 is connected, through a level adjusting network, to manufacturer-designated (m-d) terminal fourteen; lines 14-1 are connected to m-d terminals one through four; lines 14-2 are connected to m-d terminals five through eight; lines 14-3 are connected to m-d terminals nine through twelve and line 18 is connected to m-d terminal twenty-three. A HI voltage state of line 18 indicates that the BCD indications of lines 14-1 through 14-3 are stable and represent valid data.

The storing function of data store/release unit 16 is accomplished for signals on lines 14-1 by latches 62 and 64, load gates 66 and switches 68 and 70. For brevity, the circuitry showing of FIG. 2 is limited to circuitry for processing the most significant digit of the MOS and MRS data, i.e., MOS-1 and MRS-1. Latch pairs (not shown) are also provided for each of lines 14-2 and 14-3 for processing the lesser significant digits (MOS-2 and -3; MRS-2 and -3) of MOS and MRS data and load gates 66 also control such additional latch pairs.

With line 18 HI and switch 68 operated, line 72 is HI. Where switch 70 is operated with line 18 HI, line 74 is HI. On line 72 HI (LOAD OS), latch 62 stores the line 14-1 signals and applies same to lines 76 and on line 74 HI (LOAD RS), latch 64 stores the line 14-1 signals and applies same to lines 78.

Output buffers 80 and 82 are disposed between lines 76 and 78 and the individual lines 22-1 through 22-4 of the DATA BUS, as indicated. The signals applied to buffers 80 and 82 by latches 62 and 64 are transferred to lines 22-1 through 22-4 to apply individual digits to the DATA BUS, respectively on HI state of line 24-1 in the case of buffer 80 and on HI state of line 24-4 in the case of buffer 82. Lines 24-1 through 24-6 go HI in succession corresponding to the generation of gated sequencing signals GOS-1, GOS-2, GOS-3, GRS-1, GRS-2, and GRS-3. The DATA BUS thus sees MOS in its successively decreasing significance digits and then MRS in its successively decreasing significance digits.

A suitable commercially-available choice for latches 62 and 64 is MSI Quad Latch DM74L75, in which case lines 14-1 are connected to m-d terminals two, three, six and seven; lines 72 and 74 are connected to m-d terminals four and thirteen; and lines 76 and 78 are connected to m-d terminals nine, ten, fifteen and sixteen. A suitable choice for buffers 80 and 82 is SSI Tri-state Hex Buffer 74LS367 in which case, lines 76 and 78 are connected to m-d terminals two, four, six and ten; lines 22-1 through 22-4 are connected to m-d terminals three, five, seven and nine; and lines 24-1 through 24-6 are connected to m-d terminal one.

Load gates 66 may be SSI DM74L08 Quad Two-Input AND gates, in which switch 68 is connected to m-d terminal four and switch 70 is connected to m-d terminal two; line 18 is connected to m-d terminals one and five; line 72 is connected to m-d terminal size; and line 74 is connected to m-d terminal three.

In the embodiment of sequence controller 28 shown in the lower half of FIG. 3, an oscillator 84 applies its pulsed output through NAND gate 86 to counter 88. Counter 88 commences counting of oscillator pulses on operation switch 90 by CALC input 50. The binary encoded output of the counter is provided on lines 92 and is decoded by decoder 94 to affect sequential LO pulsing of decoder output lines 96-1 through 96-16. Counter 88 may be an MSI DM7493 Binary Counter, in which case switch 90 is connected to m-d terminals two and three; gate 86 is connected to m-d terminal fourteen; and lines 92 are connected to m-d terminals twelve, nine, eight and eleven. Decoder 94 may be an MSI DM74154 4-Line to 16-Line Decoder/Demultiplexer, functioning to activate a distinct one of sixteen outputs in response to each different four-bit binary input thereto. In this case, lines 92 are connected to m-d terminals twenty-three through twenty; and lines 96-1 through 96-16 are connected to m-d terminals one through eleven and thirteen through seventeen.

In the course of counting by counter 88, line 96-1 is first activated, applying the OS-1 signal to line 29-1. Line 96-2 is next activated, applying a blanking (BL) signal through NAND gate 98 to line 42. The continuing sequence will be seen as OS-2, BL, OS-3 and BL, thus providing the timing for original size data. Line 96-7 is activated at this time, and applies a DIV signal through inverter 100 to line 38. Lines 96-8 through 96-14 are now sequentially activated, giving rise to the signal sequence BL, RS-1, BL, RS-2, RS-3 and BL.

Timing is accordingly provided for reproduction size data. Line 96-15 is now activated, applying an EQ signal through inverter 102 to line 40. The subsequent BL signal provided on activation of line 96-16 is coupled both to line 42 through gate 98 and also over line 103 to affect discontinuance of operation of gate 86 in conducting the pulsed oscillator output to counter 88, thus completing the sixteen step sequence.

Lines 29-1 through 29-6 conduct the OS and RS signals to accommodator 26, and specifically to OR gates 104–114 of FIG. 4. Where the mode of system operation is with measured original size and measured reproduction size, the OS and RS signals are both conducted through gates 104–114 as gated signals GOS-1 through GRS-3 on lines 24-1 through 24-6. In the mode of system operation wherein non-measured original size is used with measured reproduction size, line 116 is activated during such mode, thereby preventing generation of signals GOS-1 through GOS-3 by gates 104–108. Conversely, in the mode of system operation wherein non-measured reproduction size is used with measured original size, line 118 is activated during such mode to suppress generation of signals GRS-1 through GRS-3 by gates 110–114.

In activation of line 116, switch 120 is operated by INPUT N-M OS 44, applying voltage v to the set (J) terminal line 122 of N-M OS flip-flop (F/F) 124. On the succeeding clock pulse CP, the Q output terminal of F/F 124 goes HI, activating line 116, and this HI is also applied to the reset (K) terminal line 126 of N-M RS F/F 128, setting the $\overline{Q}$ output terminal of this flip/flop HI.

Operation of switch 120 applies voltage v also to line 130 and through OR gate 132 to line 48 as the M (transfer to memory) signal.

With conditions as described, the $\overline{Q}$ terminal of F/F 124 is LO and, on the occurrence of OS-2, OR gate 134 and NAND gate 136 render line 50 HI, thus providing the RM (recall from memory) signal. Since the $\overline{Q}$ terminal of F/F 128 is HI, operation of OR gate 138 with gate 136 to generate an RM signal at the occurrence of the RS-2 signal is suppressed. The accommodator is cleared on completion of the calculation cycle and a CM (clear memory) signal is generated by operation of switch 140 by CLEAR N-M input 52.

Voltage v is thus applied to gate 143, generating a CM signal on line 54 and conducting such signal to the lower input of gate 141, thus generating a clear signal on line 142 for flip-flops 124 and 128. Gate 143 also receives such signal at its upper input thus allowing the application of voltage v to be discontinued and flip-flops 124 and 128 remaining cleared. Line 48a connects gate 142 to line 48 whereby the clear signal is removed from flip-flops 124 and 128 on occurrence of M signals. NAND gates 141 and 143 will be seen jointly to constitute a flip-flop and maybe of type above discussed.

Converse conditions will be seen to exist on operation of switch 144 by INPUT N-M RS 46 in use of non-measured reproduction size data. In this case, line 146 goes to voltage v for generation of the M signal as does the set (J) terminal line 148 of flip-flop 128. Line 118 is now activated by the Q terminal line of flip/flop 128 and generation of the GRS signals by gates 110–114 is suppressed. Gate 138 now is set for generation of the RM signal on the occurrence of RS-2.

In implementing the circuitry of FIG. 4, the OR gates may be SSI DM7432 Quad 2-Input OR Gates, gate 136 may be an SSI DM7400 Quad 2-Input NAND GAte, and the flip/flops may be comprised by an SSI DM7473 Flip/Flop.

Referring now to the upper half of FIG. 3, interface 32 has first (upper) inputs of OR gates 150–156 connected to DATA BUS lines 22-1 through 22-4. Second (lower) inputs of gates 150 and 152 are grounded and second inputs of gates 154 and 156 are connected to line 42 for common receipt of BL signals. Gate output lines 158 feed BCD to Decimal decoder 160 which activates its output lines 162 selectively in accordance with the arithmetic numeral (decimal) indication of the digit then on the DATA BUS or in accordance with the BL signals. Unit 164 provides an inverter in series circuit with each of lines 162, one such inverter being shown as 166. Inverter output lines 168 are provided between unit 164 and final interface stage 170, which has further input from accommodator output lines 48, 50 and 54 and from controller output lines 38 and 40.

Interface stage 170 may be implemented by employing bilateral switches, such as are commercially-available as Fairchild F4016 Quad Bilateral Switches, one switch used for each input to the calculator. Switch 172 is illustrated as exemplary in its connections for all stage 170 switches, having an enabling input line 174 and input/output lines 176 and 178 extending into interface stage 170 from the calculator. On enabling input on line 174, signal transmission occurs as between lines 176 and 178. Assuming bilateral switch 172 to be enabled in response to a BCD DATA BUS corresponding to arithmetic number seven, line 176 is connected to one terminal of the calculator key-operated switch for the number seven and line 178 is connected to the other terminal of such key-operated switch. On occurrence of the enabling input on line 174, the calculator sees the same condition as it sees when the key-operated switch is operated by key depression.

In constructing interface 32, OR gates 150–156 and inverters 166 may be of commercial type above discussed. Decoder 160 may be an MSI DM74141 BCD/Decimal Decoder in which case lines 22-1 through 22-4 are connected to m-d terminals four, seven, six and three and lines 162 are connected to m-d terminals two, one, ten, eleven, fourteen, thirteen, nine, eight, fourteen and sixteen.

As alluded to above, systems may be constructed in accordance with the invention with or without the facility for acceptance and processing of non-measured information. In the latter case, the accommodator circuitry of FIG. 4 is omitted and lines 29-1 through 29-6 of FIG. 3 are connected directly to lines 24-1 through 24-6 of FIG. 2. Interface 32 will omit input lines 48, 50 and 54 and bilateral switches associated therewith, and calculator lines affecting simulated operation of the calculator M, RM and CM key-operated switches are also omitted.

In its overall aspects, the invention provides "on-line" communication between a planimeter-type measuring device and memory calculators in widespread current use through the agencies of control means for directing traffic flow and interface means. The ordered computation, e.g., division in ratio determining, is dependent upon the time order of receipt of size parameters. In its simplest mode, the invention may employ control means, such as sequence controller 28, for successive transfer to the calculator of first type measured parameter (original size) and second type measured parameter (reduction size). In its more expansive mode, the invention may employ control means which accommodates plural variations from the signal conduction in its simplest mode, whereby transfer may be of a first type measured parameter and then a non-measured parameter of second type or of a first type non-measured parameter and then a measured parameter of second type. First and second sets of sequencing signals are generated to define time slots for such transfers and logic circuitry is responsive to input indications of system operating mode to allocate use of the time slots.

Various changes evidently may be introduced in the foregoing systems and circuit implementation without departing from the invention. The particularly described embodiments are accordingly intended in an illustrative and not in a limiting sense. The true spirit and scope of the invention is set forth in the appended claims.

What is claimed is:
1. A system for ordered computation between values of measured data of a certain kind or between a value of such measured data and a value of non-measured data of corresponding kind comprising:
   (a) calculator means having an arithmetic processor, a keyboard for entry in said calculator means of non-measured data signals indicative of values of non-measured data of first or second types of parameters, respectively, and memory means for releasable storage of non-measured data signals entered in said calculator means and indicative of said values of non-measured data;
   (b) means for measuring data of said first and second types and for generating first and second measured data signals respectively indicative of values thereof; and
   (c) control means connected to said calculator means and to said means (b)
      (1) operative in first mode for conducting said first and second measured data signals successively to said processor for arithmetic computation therebetween, or
      (2) operative in second mode on presence of such keyboard-entered non-measured data signals for transferring the same to said memory means and conducting to said processor for computation either (A) said first measured data signals and then such memory stored signals or (B) such memory-stored signals and then said second measured data signals in accordance with the respective types of non-measured data signals.

2. The system claimed in claim 1 wherein said control means includes facility for the receipt of first and second input indications respectively of the type of said keyboard-entered non-measured data signals and circuitry responsively operative to said input indications respectively for implementing such signal conduction in (c) (2) (A) or such signal conduction in (c) (2) (B).

3. A system for ordered computation between values of measured data of a certain kind or between a value of such measured data and a value of non-measured data of corresponding kind comprising:
   (a) calculator means having an arithmetic processor, a keyboard for entry in said calculator means of non-measured data signals indicative of values of non-measured data of first or second types of parameters respectively, and memory means for releasable storage of non-measured data signals entered in said calculator means and indicative of said values of non-measured data;
   (b) means for measuring data of said first and second types and for generating first and second measured data signals respectively indicative of values thereof, said measured and non-measured data signals being in plural bit digital formats; and
(c) control means connected to said calculator means and to said means (b), said control means including sequence controller means for generating sequencing signals in first set and subsequent second set, each set corresponding in number to the respective numbers of bits in such formats, said control means being
  (1) operative in first mode for conducting said first and second measured data signals successively to said processor for arithmetic computation therebetween, or
  (2) operative in second mode on presence of such keyboard-entered non-measured data signals for transferring the same to said memory means and conducting to said processor for computation either (A) said first measured data signals and then such memory stored signals or (B) such memory-stored signals and then said second measured data signals in accordance with the respective types of non-measured data signals.

4. The system claimed in claim 3 wherein said control means includes accommodator circuit means for gating to said processor said first measured data signals coincidentally with said sequencing signals in said first set and said second measured data signals coincidentally with said sequencing signals in said second set, thereby affecting said first mode operation in (c) (1).

5. The system claimed in claim 4 wherein said accommodator circuit means is operative on such first input indication thereto for gating to said processor said first measured data signals coincidentally with said sequencing signals in said first set, for suppressing gating of said second measured data signals to said processor and for conducting such memory-stored signals to said processor during the occurrence of sequencing signals in said second set.

6. The system claimed in claim 4 wherein said accommodator circuit means is operative on such second input indication thereto for suppressing gating of said first measured data signals to said processor, for conducting such memory-stored signals in said first set and for gating to said processor said second measured data signals coincidentally with said sequencing signals in said second set.

7. The system claimed in claim 4 wherein said sequence controller means further generates function signals both between generation of said first and second sets of sequencing signals and subsequent to generation of said second set of sequencing signals, said control means conducting said function signals to said processor on generation thereof for ordering such system computation.

8. The system claimed in claim 7 wherein said sequence controller means further generates blanking signals following generation thereby of each of said sequencing and function signals, said control means conducting each said blanking signal to said processor on generation thereof for simulating the release of a keystroke in said calculator means.

9. A system for determining the ratio of values of original size data to reproduction size data in the graphic arts, either of said values being measured data or one value being measured data and the other non-measured data, comprising:
(a) calculator means having an arithmetic processor, a keyboard for entry in said calculator means of non-measured data signals of a first type indicative of values of said original size or signals of a second type indicative of values of said reproduction size, and memory means for releasable storage of non-measured data signals entered in said calculator means and indicative of the values of said non-measured data;
(b) means for measuring data of said first and second types and for generating first and second measured data signals respectively indicative of values thereof; and
(c) control means connected to said calculator means and to said means (b)
  (1) operative in first mode for conducting said first and second measured data signals successively to said processor for arithmetic computation therebetween; or
  (2) operative in second mode on presence of such keyboard-entered non-measured data signals for transferring the same to said memory means and conducting to said processor for computation either (A) said first measured data signals and then such memory-stored signals or (B) such memory-stored signals and then said second measured data signals in accordance with the respective types of said non-measured data signals.

10. The system claimed in claim 9, wherein said means (b) includes indexing means displaceable with respect to an original document for generating a signal indicative of the percentage value of such original size and for generating a further signal indicative of the percentage value of such reproduction size.

11. The system claimed in claim 10 wherein said means (b) includes analog to digital conversion-means for providing such generated signals in digital format.

12. The system claimed in claim 11 wherein said control means includes sequence controller means for generating: a first set of sequencing signals corresponding in number to the individual digital bits of said original size value indicative signals; a second set of sequencing signals corresponding in number to the individual digital bits of said reproduction size value indicative signals; and function signals affecting such ratio computation between said original and reproduction size values said control means conducting said sequencing and function signals to said processor on generating thereof for ordering such system computation.

13. The system claimed in claim 12 wherein said sequence controller means generates blank signals following generation thereby of each of said sequencing and function signals, said control means conducting said each blanking signal to said processor on generation thereof for simulating the release of a keystroke in said calculator means.

14. A system for determining the ratio of values of original size data to reproduction size data, comprising:
(a) calculator means having an arithmetic processor;
(b) means for measuring such size data and for generating first and second measured data signals respectively indicative of said original size and said reproduction size; and
(c) control means connected to said calculator means and to said means (b) and operative for conducting said first and second measured data signals successively to said processor for arithmetic computation therebetween.

15. The system claimed in claim 14 wherein said means (b) comprises indexing means displaceable with respect to an original document for generating signals indicative of the respective values of said original size and said reproduction size.

* * * * *